May 4, 1965

W. K. BROWN 3,181,898

MULTI-CONDUIT HYDRAULIC SWIVELS

Filed Oct. 5, 1959

INVENTOR.
WILBURN KELLY BROWN
BY Jones, Daebo & Robertson
ATTYS.

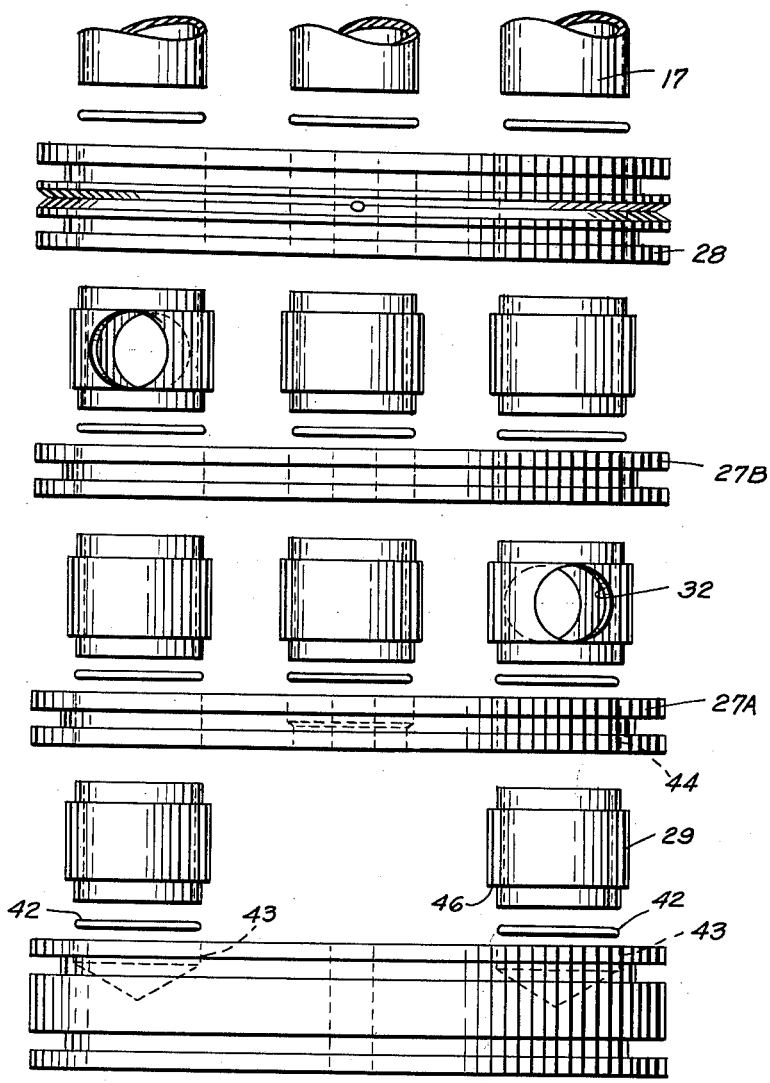

United States Patent Office 3,181,898
Patented May 4, 1965

---

3,181,898
MULTI-CONDUIT HYDRAULIC SWIVELS
Wilburn Kelly Brown, Morton Grove, Ill., assignor to Pettibone Mulliken Corporation, Chicago, Ill., a corporation of Delaware
Filed Oct. 5, 1959, Ser. No. 844,391
3 Claims. (Cl. 285—137)

Hydraulic swivels are likely to be needed whenever hydraulically actuated apparatus is swively mounted on a base from which it is controlled. For example, in mobile loaders of the swing-type, the operator rides in a seat on the mobile chassis and controls valves adjacent to his seat which controls various operating functions of the swing portion of the apparatus. For example, there may be carried by a turntable a structure which includes a reaching link, a lifting boom carried by the link, and load handling means carried at the end of the boom which may have several differently actuated parts. Preferably each of the separately actuated parts is powered by one form or another of hydraulic motor having the two conduits leading to it, either of which may carry hydraulic fluid under pressure or hydraulic return fluid, depending upon the setting of the valve by the operator on the mobile chassis. Thus, if there should be five separately actuated devices carried by the turntable, ten conduits extending between them and the bank of valves by the operator would be required.

Hydraulic swivels are old. Commonly they comprise a core somewhat in the form of a solid cylinder having connections at its lower end for conduits leading to the valve bank and surrounded by a sleeve having connections for the conduits leading to the actuated parts. As the sleeve rotates on the core, moving with the turntable, each connection of the sleeve is always in communication with the same one of the stationary connections of the core. The core is usually in the form of a solid bar of metal with a plurality of longitudinal bores drilled to different depths to communicate with radial bores opening at the different levels of the connections of the shell.

Hydraulic swivels for two or three conduits have not presented any difficult problems, especially when the conduits were of small diameter and the hydraulic pressures only moderate. The problem of providing satisfactory hydraulic swivels has become increasingly difficult as the number of conduits increased and as increasing power requirements for the actuated parts necessitated higher pressures and larger diameters of conduits. In my prior application, Serial Number 543,942, filed October 31, 1955, now abandoned, I disclosed a hydraulic swivel which was adequate for the conditions then encountered and which at that time seemed quite severe. Already, the requirements have expanded far beyond the requirements of 1955. Pressures are used now which make the old rings of rubberlike material then used out of the question, even with the careful designing there disclosed. To maintain adequate speed of movement of the actuated parts, with the heavier loads that they are subjected to, large cross-sectional flow areas are still needed. The number of separately actuated parts has increased.

For example, one piece of apparatus requires eight large diameter conduits and two of smaller diameter. To accommodate these conduits entering one end of the core of a swivel, according to my prior application, and to provide adequate communication between all these conduits and the connections of the shell has required a monstrous swivel. Amazing size reduction accomplished by the present invention not only saves space and material, but makes the unit light enough to be easily installed and avoids other problems which are encountered when diameters and torque arms are increased. A key feature in obtaining this size reduction is constructing the core by fabrication thereof from plates and tubular pieces instead of using a core that is solid except for drilled or cored out passages. This also avoids the necessity of forming annular grooves around the core in alignment with the various shell connections. It may be surprising that there is any space saving by fabricating the core from parts instead of drilling but the fact remains that a core, built according to FIG. 1 and FIG. 2, herein, providing said eight large diameter passages and two small diameter passages, has been found successful with a five inch diameter and a length less than eleven inches, whereas the same requirements with a solid core, following approximately the style of my prior patent application mentioned required a seven inch diameter and a twenty-one inch length. The present fabricated core therefore occupies an overall volume not much more than a quarter of the size of the old, and its weight is estimated to be in the neighborhood of only one-eighth the weight of the old.

Additional objects and advantages of the invention will be apparent from the following description and from the drawings.

Designation of figures

FIG. 3 is a diagrammatic exploded view to be used in describing the assembly of the core shown in FIG. 1.

General description

Figure 1:
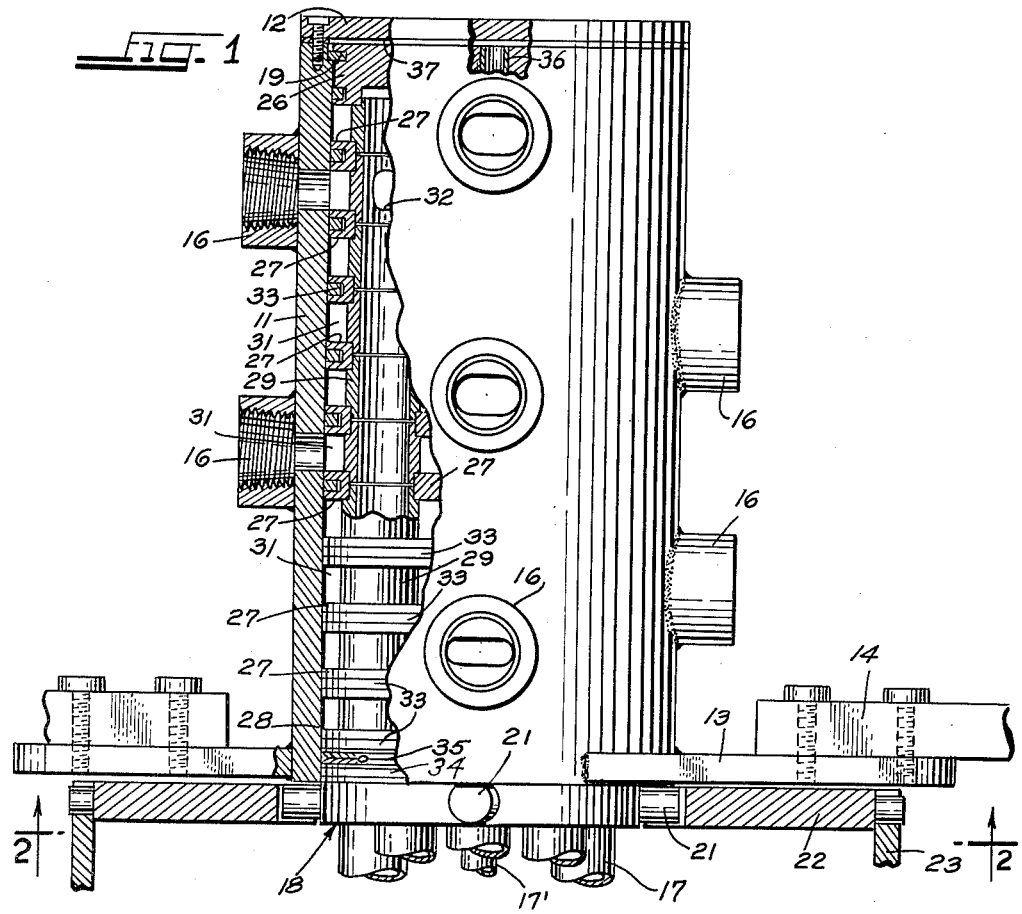
FIG. 1 is a side elevation, partly broken away, of a hydraulic swivel chosen for illustration of the present invention.
Figure 2:
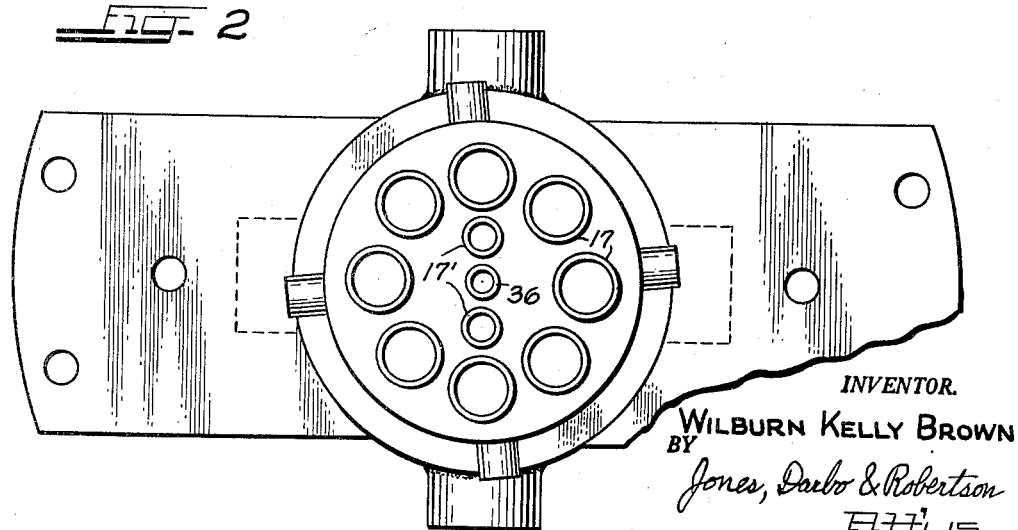
FIG. 2 is a bottom view of the hydraulic swivel of FIG. 1, the connecting tubes being shown in section taken approximately on the line 2—2 of FIG. 1.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combination in which the inventive concepts are found.

The illustrated form of hydraulic swivel includes a shell 11 closed at its top by a cap 12 which is sealed to the shell 11 by a gasket. The shell 11 is provided with attachment ears 13 by which it may be secured to a rotary structure such as a turntable represented fragmentarily at 14. The turntable 14 may also carry hydraulically actuated loading apparatus, for example as disclosed in my copending application mentioned, the disclosure of which is incorporated herein by reference.

The shell 11 is provided with connectors 16 to which high pressure hoses or other conduits may extend from the hydraulic actuators of the loader or other apparatus carried by the turntable. Regardless of the angular position of the turntable 14, each of the connectors 16 should be at all times in communication with a certain one of the tubes or pipes 17 extending downwardly in fixed position from the bottom of the swivel assembly.

Each of the tubes 17 is secured to the bottom of the core 18 which rides within the shell 11. The present invention relates especially to the construction of the core 18. It may first be noted, however, that the core 18 is held suspended within the shell 11 by a two-part ring 19. The core 18 is held against rotation by pins 21 carried by core 18 and engaging notches in a stationary member 22. In the illustrated construction, the stationary member 22 is merely an adapter which in turn is held by a retainer 23 which may be a part of or more directly carried by the base structure by which turntable 14 is rotatably carried.

Construction of core

According to the present invention the core is fabricated from a top plate 26, a plurality of intermediate plates 27 (which may also be 27A, 27B, etc.) and a bottom plate 28. These various plates are spaced apart and sealed to spools 29 which, jointly considered, form tubes communicating with the tubes 17. Each of the tubes 17 communicates through its tubular set of spools 29 with one of the inter-plate spaces 31. In some instances this communication is by means of holes 32 drilled in opposite sides of a spool 29. In other instances the communication may be through the end of the last spool of a series, as will be more apparent from FIG. 3, having reference especially to the spools' position to form the middle tube of spools there.

Each of the plates 26, 27 and 28 is grooved to receive, and has fitted therein, a split-sealing ring 33 bearing resiliently against the inner wall of shell 11. These rings may be conventional hydraulic piston rings.

Because there is inevitably some slight seepage past such piston rings, the loss and dripping of the oil or hydraulic fluid is preferably prevented. To this end, a rubber seal ring 34 is preferably provided, being stretched over the core and allowed to contract into a groove in bottom plate 28, outwardly positioned with respect to its piston ring 33. Between the piston ring 33 and the rubber sealing band 34, a groove 35 extends around plate 28 and communicates through a radial bore with a drain tube 36 extending lengthwise through the core at its axis. The tube 36 thus communicates also with the head space 37 above the head plate 26 so as to drain off any slight seepage past the upper piston rings 33. The lower end of tube 36 is connected to a return conduit leading to the hydraulic reservoir.

Within each of the connectors 16 an aperture 41 is provided through the wall of shell 11. Each aperture 41 is of the same height of the inter-plate space with which it is aligned, and is of the full length permitted by the fitting 16. It will be observed from FIG. 1 that the two lower inter-plate spaces 31 are of less height than the remainder.[1] These smaller inter-plate spaces 31 are the ones to which the two smaller tubes 17' open. Both these tubes 17' and their connected inter-plate spaces 31 can be smaller because they happen to be used to supply hydraulic actuators requiring a smaller volume of flow than is required by the hydraulic actuators to which the larger tubes are connected.

As is described in the previous application mentioned, the fittings 16 are couplings. It is believed that those skilled in the art would recognize from this that as here illustrated these fittings 16 are separate pieces welded to the shell 11. Naturally, the welding would have to extend all around to effectuate a thorough seal. To the extent that this paragraph is not in any way disclosed in the prior application mentioned, it is not to be deemed a part of the present application, since the required oath cannot be made with respect to it, as a new application.

The spools 29 are screw machine parts made from seamless steel tubing. Accordingly they have adequate strength with much thinner wall section than would be required in a casting, from which cores have been made heretofore. Accordingly, the space intervening the spools can be utilized. Thus when a spool which opens into an inter-plate space 31 is at the far side of the core from the fitting 16 aligned with this same inter-plate space the hydraulic fluid is free to flow between the various spools as well as around the outside of them. This makes it practicable to locate the spools at least as close to the periphery of the core as is illustrated whereas according to past practice they had to be separated from the periphery of the core by a distance equal to the sum of the necessary wall thickness in a casting plus the depth of peripheral groove necessary to provide adequate cross-sectional flow area when the groove alone must sometimes carry the hydraulic fluid from a remote location to the fitting. It is this ability to locate the tubular rows of spools close to the periphery that cooperates with relatively thin wall characteristics of the tubes to make it possible to provide a circle of eight large passages in a core of the same diameter previously required for four.

Assembly of core

The assembly of the core can best be described with respect to FIG. 3. The core is assembled upside down. The head plate 26 is thus at the bottom, as seen in FIG. 3. A set of copper rings 42 is dropped into recesses 43, and then a set of spools 29 is pressed into the recesses 43. Then the first intermediate plate 27A is pressed down over the spools 29. Because the spools 29 are accurately formed on a screw machine and are identical, and because they are somewhat oversized with respect to the recesses 43 and the holes 44, so that a press fit is necessary, the plate 27A is extremely accurately positioned with respect to the head plate 26.

Thereafter additional rings of copper 42 are dropped into the apertures 44 to rest on the first set of spools 29, and another set of spools 29 is pressed into the openings 44. This assembly is continued layer by layer until the bottom plate 28 has been pressed over the last set of spools 29. After the next set of copper rings are dropped in place, the tubes 17 are individually tapped into place until they bear on the copper rings, since they have no shoulders 46, as do the spools, to limit their penetration. The shoulders 46 are accurately formed in radial planes by virtue of the screw machine manner of manufacture, and therefore they accurately determine true perpendicularity of the spools 29 to the respective plates when they are pressed home.

The next step of the assembly is to insert the tube 36. Although this tube could be made up of spools in the same way as has been described, it is believed to be more practical in this instance, where a very small diameter tube is involved, to use a one piece tube. This tube is passed through all of the plates and preferably has light press fit with them. According to present practice, tube 36 is expanded slightly after insertion by forcing a slightly oversized ball through it. This not only insures tight contact between the outer wall of tube 36 and the apertures of the various plates, but it also tends to coin the tubes slightly around the edges of the apertures through the plates so as to ensure a very firm bond. However sealing of all parts is ensured by hydrogen brazing the entire core assembly. After coating all areas to be sealed with brazing mixture such as copper powder and flux, the core is subjected to a high temperature in a hydrogen atmosphere, during which time the metal of the brazing compound and also the metal of the rings 42 melts and by a capillary attraction is spread throughout the joints to be sealed. According to present practice, the core assembly is clamped firmly together during brazing by a bolt extending through the axially positioned tube 36 and tightened up to draw firmly on the two end plates. It is probable that future experience may show that neither this clamping together nor the rings 42 are necessary.

It is not necessary that all of the tubular columns of spools 29 extend from the bottom plate all the way to the top plate 26. Enough of them should extend that far to ensure accurate positioning of the plates relative to one another and rigidity in resisting twisting forces during turning movements and hydraulic forces at all times. It has been found sufficient to extend four of the tubular columns all of the way, terminating each of the others at the bottom of the inter-plate space with which it is to communicate. Of course, the holes are not provided in the plates except where the spool is to be used.

After brazing and heat treatment for normalizing or removing stresses, the core assembly is turned, ground ---
[1] The draftsman failed to show them, especially the next to bottom one, as small as they should be.

(about an axis) and polished to provide it with an accurate outside diameter and to provide the grooves for piston rings 33.

Although perhaps a variety of metals can be used, it may be helpful to know some choices which have been found satisfactory. For the retaining half rings 19, for the spools 29 and for the tube 36, 10–20 dead soft steel has been used. The plates are formed of cold-rolled plates.

The shell 11 may be formed of seamless steel tubing but after all of the fittings 16 and ears 13 have been welded to it, it will be normalized and then ground and honed. Because external couplings 16 ensure its freedom from distortion as threaded pipe fittings are tightened into them, the clearance between plates 26, 27, 28 and shell 11 can be very slight, a thousandth of an inch all around during use being enough. Approximately an extra thousandth of an inch is allowed for differential expansion, the plates running at a higher temperature than the shell, both being heated by the hydraulic fluid but only the shell being exposed to atmospheric cooling.

In final assembly, the core is slipped up through the shell 11 to a little above its normal position so that the half rings 19 can be slipped into place whereupon the core is lowered until the half rings 19 rest on their shoulders within shell 11, whereupon cap 12 may be sealed down.

Although this invention has been illustrated with a ten conduit swivel, and is perhaps most useful in swivels with numerous conduits, it has also been found advantageous for a two-conduit swivel, in which case the diameter may be quite small. In any size it is believed that a swivel is provided with amazing compactness and lightness as compared to prior art swivels, the dependability being at least as great as the best found in the prior art.

I claim:

1. A hydraulic swivel including a shell having a plurality of conduit fittings disposed at different locations axially of the shell and communicating with the interior of said shell through radial openings defined by the shell, and a core within the shell in relatively rotatable relation thereto; said core comprising a plurality of tubular spacer spools and a plurality of axially spaced annular plates having inter-plate spaces therebetween, said core having a plurality of longitudinally extending passageways defined by a plurality of said tubular spools disposed in axial alignment between and rigidly spacing adjacent pairs of said plates and axially aligned apertures formed in the intervening plates, said passageways communicating with conduits through apertures formed in a plate at one end of the core; different inter-plate spaces communicating with different passageways through an aperture formed in the spool defining the appropriate passageway and each inter-plate space being radially aligned and in communication with a conduit connection on the shell; the radially outer periphery of each of said plates having means forming a rotary seal with the inner surface of said shell; said spools each having on each end shoulders in radial planes, said shoulders bearing on said plates; and said spools and plates being sealed and secured with respect to one another; and said shell having a cylindrical inner surface closely spaced from said spools, the spaces between the plates being open except for said spools.

2. A hydraulic swivel including a shell having a plurality of conduit fittings disposed at different locations axially of the shell and communicating with the interior of said shell through radial openings defined by the shell, and a core within the shell in relatively rotatable relation thereto; said core comprising a plurality of tubular spacer spools and a plurality of axially spaced annular plates having inter-plate spaces therebetween, said core having a plurality of longitudinally extending passageways defined by a plurality of said tubular spools disposed in axial alignment between and rigidly spacing adjacent pairs of said plates and axially aligned apertures formed in the intervening plates, said passageways communicating with conduits through apertures formed in a plate at one end of the core; different inter-plate spaces communicating with different passageways and each inter-plate space being radially aligned and in communication with a conduit connection on the shell; the radially outer periphery of each of said plates having means forming a rotary seal with the inner surface of said shell; said spools each having on each end shoulders in radial planes, said shoulders bearing on said plates; and said spools and plates being sealed and secured with respect to one another; and said shell having a cylindrical inner surface closely spaced from said spools, the spaces between the plates being open except for said spools.

3. A hydraulic swivel according to claim 2 in which the spools have annular projections extending beyond said shoulders fitting tightly into said apertures in said plates; and said spools and plates are sealed and secured with respect to one another by a fusion-seal type of construction.

References Cited by the Examiner
UNITED STATES PATENTS

| | | | |
|---|---|---|---|
| 2,343,491 | 3/44 | Bard | 285—190 |
| 2,471,475 | 5/49 | Andrus | 285—286 |
| 2,477,852 | 8/49 | Bacon | 253—39 |
| 2,768,843 | 10/56 | Zeilman | 285—190 |
| 2,820,650 | 1/58 | Leopold | 285—134 |
| 2,873,810 | 2/59 | Orton | 285—190 |

CARL W. TOMLIN, *Primary Examiner.*

ARTHUR B. MILLER, *Examiner.*